(12) United States Patent
Govindaraju et al.

(10) Patent No.: US 7,840,643 B2
(45) Date of Patent: Nov. 23, 2010

(54) SYSTEM AND METHOD FOR MOVEMENT OF NON-ALIGNED DATA IN NETWORK BUFFER MODEL

(75) Inventors: Rama K. Govindaraju, Hopewell Junction, NY (US); Chulho Kim, Poughkeepsie, NY (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 10/959,801

(22) Filed: Oct. 6, 2004

(65) Prior Publication Data

US 2006/0095535 A1    May 4, 2006

(51) Int. Cl.
    *G06F 15/16* (2006.01)
(52) U.S. Cl. .................. 709/213; 709/212; 709/217; 709/218; 709/216; 709/219
(58) Field of Classification Search .............. 709/217, 709/218, 216; 370/474
    See application file for complete search history.

(56) References Cited

U.S. PATENT DOCUMENTS

| | | | |
|---|---|---|---|
| 5,930,820 A | 7/1999 | Lynch | |
| 6,370,632 B1 | 4/2002 | Kikuta et al. | |
| 6,442,661 B1 | 8/2002 | Dreszer | |
| 6,516,343 B1 * | 2/2003 | Pong et al. | 709/216 |
| 2003/0112806 A1 * | 6/2003 | Kim | 370/395.52 |
| 2003/0154346 A1 | 8/2003 | Gruner et al. | |
| 2004/0008728 A1 * | 1/2004 | Lee | 370/474 |
| 2004/0171395 A1 * | 9/2004 | Shin | 455/466 |
| 2005/0223118 A1 * | 10/2005 | Tucker et al. | 709/250 |
| 2007/0140491 A1 * | 6/2007 | Yi | 380/250 |

OTHER PUBLICATIONS

L. Schaelicke et al. "Improving I/O Performance with a Conditional Store Buffer", IEEE, 1998, pp. 160-169.
V. Pai et al. "IO-Lite: A Unified I/O Buffering and Caching System," IEEE ACM Transactions on Computer Systems, Feb. 2000, vol. 18, No. 1, pp. 37-66.

* cited by examiner

*Primary Examiner*—Djenane M Bayard
(74) *Attorney, Agent, or Firm*—Matthew W. Baca; Jack V. Musgrove

(57) ABSTRACT

A method is provided for transferring data between first and second nodes of a network. Such method includes requesting first data to be transferred by a first upper layer protocol (ULP) operating on the first node of the network; and buffering second data for transfer to the second node by a lower protocol layer lower than the first ULP, the second data including an integral number of standard size units of data including the first data. The method further includes posting the second data to the network for delivery to the second node; receiving the second data at the second node; and from the received data, delivering the first data to a second ULP operating on the second node. The method is of particular application when transferring the data in unit size is faster than transferring the data in other than unit size.

18 Claims, 3 Drawing Sheets

SYSTEM AND METHOD FOR MOVEMENT OF NON-ALIGNED DATA IN NETWORK BUFFER MODEL

BACKGROUND OF THE INVENTION

The present invention is directed to the communication of data within a network, especially a network of computing devices.

An important factor that affects the speed of processing within a computer network is the speed at which data is communicated between computers. Data communication speed is especially important in more complex networks in which clusters of smaller networks of computers are linked to each other and share certain common resources. The speed at which data is communicated in such networks impacts the availability of common resources, in turn affecting processing speed and potentially the integrity of the data available to the computers in the network.

Conventionally, data is transferred between the nodes of a network in whatever quantity is requested by a requesting agent, an upper layer protocol being an example of such agent. In some networks, when the requested quantity is a unit size quantity of data, the data is transferred to the network in a relatively quick manner because of predetermined procedures for handling such transfers in unit size quantities. However, when the requested quantity is not a unit size, the available procedures for handling such transfers may cause the data to be transferred more slowly to the network. Non-unit size data transfers contribute to latency, which can be considered idle time or wasted time for the system, when processing at a receiving node awaits receipt of data from another node. In a network, latency is the amount of time it takes data to transmit and receive a user message having zero length. A zero length message has a protocol header, so the actual number of bytes transferred is greater than zero but the header still has a smaller number of bytes than a cache line size, which is typically 128 bytes. On the other hand, bandwidth is the amount of data that can be transmitted and received per unit of time. Bandwidth is particularly important for the transfer of data between devices, e.g., nodes of a network.

Data transfers in a network can be categorized as either a memory transfer or an input/output (I/O) transfer. In either case, a common system or network bus may be used to route the data. Since a bus is a shared resource, latency affects performance.

FIG. 1 illustrates a data transfer method provided by a prior art computer network. For simplicity, only two nodes 210 and 220 of the network are illustrated. Nodes 210 and 220 have associated network adapters 231 and 232, respectively, and user buffers 241 and 242, respectively. An upper level protocol on the first node 210 directs data transfers from a user buffer 241 on the first node 210 to a user buffer 242 on the second node 220. This is accomplished using a data staging buffer 251 managed by network adapter 231 on the first node 210 to transfer the data to another like data staging buffer 252 managed by network adapter 232 on the second node 220. Similarly, an upper level protocol on the second node 220 directs data transfers from a user buffer 242 on the second node 220 to a user buffer 241 on the first node 220. In like manner to the above-described transfer, this is also accomplished using a data staging buffer 252 managed by network adapter 232 on node 220, and using the data staging buffer 251 managed by network adapter 231 on the first node 210. In the particular arrangement shown, data staging buffer 251 includes one sending buffer 261 having a first-in-first-out (FIFO) organization (hereinafter "SEND FIFO"), and one receiving buffer 271 having a FIFO organization (hereinafter "RECEIVE FIFO"). Likewise, the data staging buffer 252 of node 220 includes a SEND FIFO buffer 262 and a RECEIVE FIFO buffer 272.

When a particular amount of data smaller than a standard size is to be transferred from node 210 to node 220, for example, when the data is smaller than the size of a cache line, the upper level protocol (ULP) operating on node 210 requests that the particular amount of data be transferred to node 220. For example, assume that the particular amount of data to be transferred is 109 bytes, while the cache-line size is 128 bytes. As part of the transfer process, the requested amount (109 bytes) of data is copied from the user buffer 241 to the SEND FIFO buffer 261. The network adapter 231 then copies the requested amount of data from the SEND FIFO buffer 261 into a memory 265 of its own. The network adapter 231 may begin copying the data to its memory 265 before all of the data has been copied from the user buffer 241 to the SEND FIFO 261. Once some of the data is available in the adapter memory 265, the adapter 231 then transfers the data to the adapter at the receiving end in any of several available ways for sending data having length smaller than a cache line. Unfortunately, such methods of transferring data can actually take longer to transmit the data than is true when the data is transferred in other than an integral number of units of the data. This is especially so if the data transfer operation is interrupted in progress.

Latency within the network is impacted when the time required for transferring data between nodes is increased, as here. To the node that awaits the transferred data, latency unnecessarily causes delays in processing, since the node awaiting the transferred data cannot either begin processing or continue processing until the transferred data arrives. In addition, the bandwidth for transferring data across the network appears lower when the total amount of time it takes to transfer the data is higher than it is for transferring an integral number of units of the data. Consequently, a need exists for an improved system and method having improved efficiency for transferring data of non-standard size, e.g., non-cache line aligned data, between nodes of a network, to permit a reduction in latency and an increase in bandwidth for such transfers.

SUMMARY OF THE INVENTION

According to an embodiment of the invention, a method is provided for transferring data between first and second nodes of a network. Such method includes requesting, by a first upper layer protocol (ULP) operating on the first node of the network, first data to be transferred, the first data having a length not equal to an integral number of standard units of data; and buffering, by a lower protocol layer of the first node, the lower protocol layer being lower than the first ULP, second data in a buffer for transfer to the second node, the second data including an integral number of standard size units of data including the first data the second data being buffered by copying data from a memory at the first node into a buffer, the data being copied in units aligned to cache line boundaries of the memory. The method further includes posting, by the first node, the second data to the network for delivery to the second node; receiving the second data at the second node; and from the received data, delivering the first data to a second ULP operating on the second node, the length of the first data delivered being equal to the length of the first data and not the length of the second data such that remaining data of the second data is not delivered. The method is of particular application when transferring the data in unit size is faster than transferring the data in other than unit size.

According to another aspect of the invention, a machine-readable recording medium having instructions recorded thereon is provided for performing a method of transferring data between first and second nodes of a network, wherein the method includes requesting, by a first upper layer protocol (ULP) operating on the first node of the network, first data to be transferred, the first data having a length not equal to an integral number of standard units of data; and buffering, by a lower protocol layer of the first node, the lower protocol layer being lower than the first ULP, second data in a buffer for transfer to the second node, the second data including an integral number of standard size units of data including the first data, the standard size being a size of a cache line used in a cache of the first node. The method further includes posting, by the first node, the second data to the network for delivery to the second node, the posting including posting each of the units of the second data to the network by a network adapter layer protocol; receiving the second data at the second node, and from the received data, delivering the first data to a second ULP operating on the second node, the length of the first data delivered being equal to the length of the first data and not the length of the second data, such that remaining data of the second data is not delivered.

According to yet another aspect of the invention, a data communication apparatus operable to transfer data to and receive data from a network is provided, which includes a first node, the first node comprising an upper layer protocol (ULP), the ULP operable to request first data to be transferred to a device through the network, the first data having a length not equal to an integral number of standard units of data; and a buffer on the first node to buffer second data for transfer, the second data being buffered by a lower protocol layer, responsive to a command issued by the ULP to buffer data for transfer to the network, the second data including an integral number of standard size units of data, the second data including the first data the second data being buffered by copying data from a memory at the first node into a buffer, the data being copied in units aligned to cache line boundaries of the memory, the first node to post the second data to the network as a first message for delivery to the device, the device being operable to receive the second data. A lower protocol layer on the device is to deliver the first data contained in the transferred second data to a ULP operating on the device, the length of the first data delivered being equal to the length of the first data and not the length of the second data such that remaining data of the second data is not delivered.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

As described above, dividing the data to be transferred into multiple smaller portions causes the data to take longer to be transferred from one node of the network to another, and thus negatively impacts latency and bandwidth. Embodiments of the invention overcome this problem by providing a system and method for transferring data between nodes of a network in standard size units of data, e.g. in units of a cache line, instead of attempting to transfer smaller amounts of data or even smaller divided portions thereof. Such standard size units are transferred more quickly across the network, thus reducing latency and increasing bandwidth.

Figure 1:
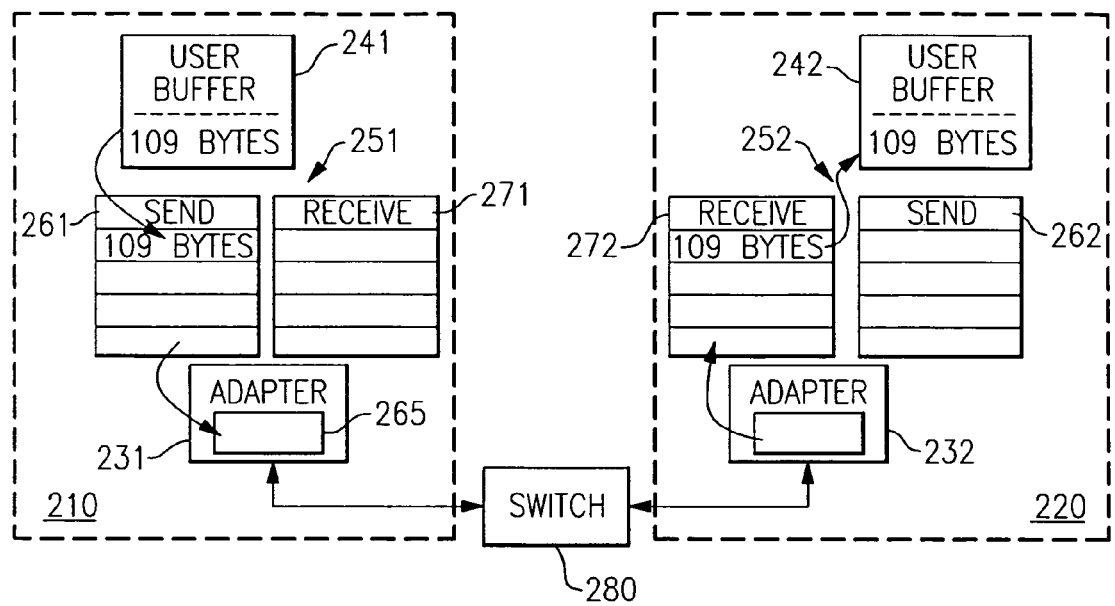
FIG. 1 is a prior art diagram illustrating the conventional transfer of data between nodes of a network.
Figure 2:
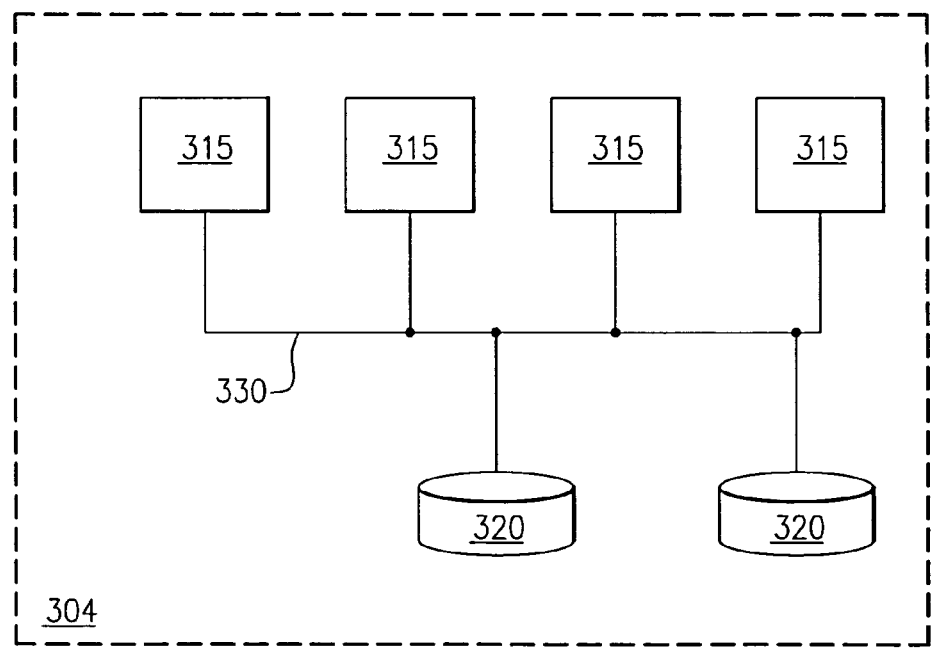
FIG. 2 is a schematic diagram of a complex computer network having a cluster of nodes and one or more storage units.

FIG. 2 illustrates a complex computer network 300 in which embodiments of the invention are adapted to operate: The complex computer network 300 includes multiple clusters 304. For simplicity, FIG. 2 illustrates only one such cluster shown in 304. As shown, cluster 304 includes a plurality of nodes 315 operable to communicate messages including data transfers by way of a communication means 330. The nodes 315 each have a unique identity and may include a single computing device or a computer system including one or more local or main memory components, displays, printers, input output (I/O) devices or computer devices that are networked together, each node being connected to a communication means 330 by way of a network adapter controlled by each individual node. The communication means 330 can be very simple, having only a few links between nodes and one or two intermediate nodes such as a router. Alternatively, the communication means can be complex, having a plurality a busses, routers, switches, bridges, and similar components.

Through their network adapters, nodes 315 communicate with each other to transfer data to and from one or more storage units 320. The storage units may include storage disks or other storage devices, such as tape drives, semiconductor memories, and the like. Storage units can also be networked directly to permit direct communication between them.

In complex computing environments, each cluster 304 shown in FIG. 2 may have its own platform and sub-environment, which may be very different than that of the next cluster. To provide transparent processing across these environments, tools are provided for making such processing seamless and platform independent. However, in the description which follows, certain common platform elements of the nodes including a lower layer adapter protocol and upper layer protocol are assumed.

Figure 3:
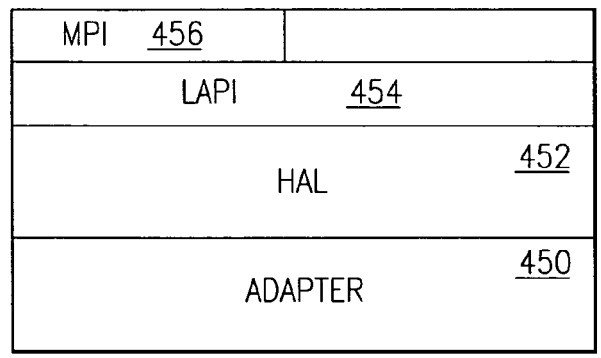
FIG. 3 is a diagram of a layered protocol stack utilized in an embodiment of the invention.

Embodiments of the invention are implemented with reference to a communication protocol stack that is active on a processor of a node and a network adapter of the node. FIG. 3 illustrates an exemplary communication protocol stack for a node. The lower layer of the protocol stack is a hardware abstraction layer (HAL), as illustrated in FIG. 3 at 452. HAL is a protocol layer that translates higher level commands, such as from a computer operating system, into instructions for interacting with a hardware device at a detailed hardware level. HAL is called from either the operating system kernel or from a device driver running at the node. In either case, such calling program interacts with the network adapter on a more general level than it would otherwise need to interact.

The operating system of a node 315 transfers data between that node and other nodes of the network through its network adapter by commands passed to and from the HAL. In addition, HAL provides the capability of monitoring, and detecting the activities of multiple types of input devices and those of data transfers across the system environment. In a preferred embodiment, both a low level application programming interface (LAPI) and a message passing interface (MPI) are provided as upper layer protocols on the nodes of the network. FIG. 3 schematically illustrates the relationship between the LAPI 454, HAL 452 and MPI 456 communication protocol layers.

Figure 4:
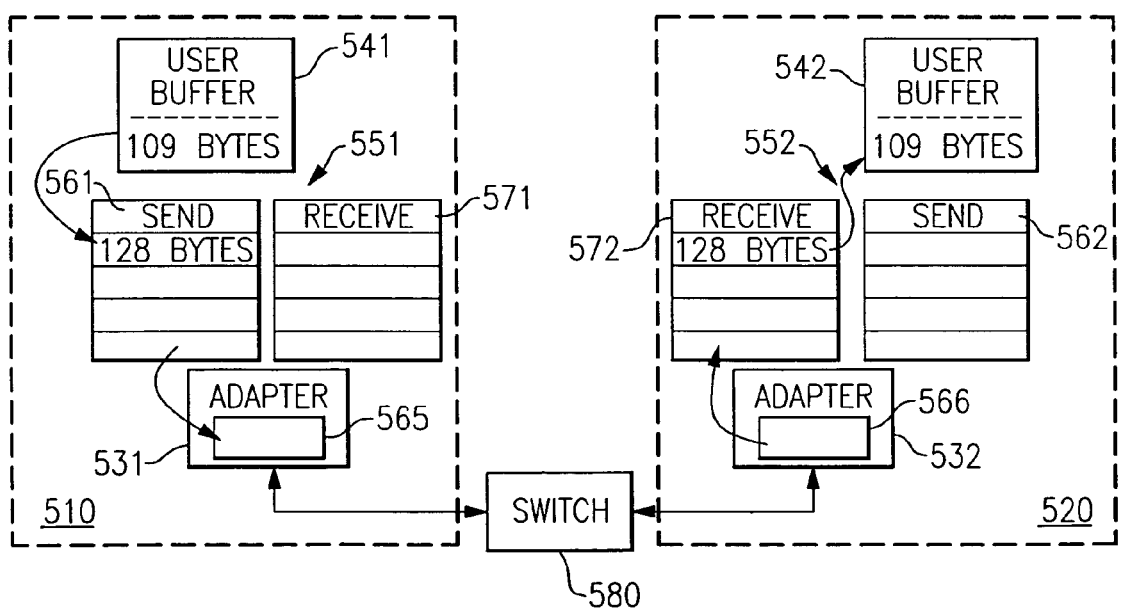
FIG. 4 is a schematic diagram illustrating the transfer of data between nodes of a computer network according to an embodiment of the present invention.

In FIG. 4, for ease of reference for the description of data transfer operations to follow, two nodes out of the many that may exist in a cluster of computer systems 304 (FIG. 2) are illustrated, with the understanding that the data transfers described herein can be conducted between more than the two nodes. Alternatively, the nodes can be part of a less sophisticated computing network, such as two PCs connected simply by a direct link, or over the Internet, or otherwise connected together in processing communication over a more complex network including one or more local area networks (LAN), and/or one or more wide area networks (WANs) or the like.

In either case, in the schematic illustration of FIG. 4, a first node and a second node are referenced at 510 and 520, respectively. Each node has a network adapter associated with it, as illustrated respectively at 531 and 532. A user buffer 541 is provided at the first node 510, which is controlled by an upper level protocol of the first node 510, and a user buffer 542 is provided at the second node 520, which is controlled by an upper level protocol of the second node 520

The upper level protocol of the node 510 is typically represented by a LAPI protocol layer 454 or MPI protocol layer 456, as described above with reference to FIG. 3. LAPI is based on a remote memory copy (RMC) model. RMC is a one-sided programming paradigm similar to the load/store model of shared memory programming. The one-sided model eases some of the difficulties of the send/receive model, which uses two-sided protocols.

MPI allows for the transfer of data in a transparent way, which is protocol independent. MPI was developed by a group of industry, academic, and government representatives with experience in developing and using message-passing libraries on a variety of computer systems. MPI was developed to serve as a common standard, bringing together years of research and experience with message passing. Programs expressed this way using MPI may run on distributed-memory multiprocessors, shared-memory multiprocessors, networks of workstations, and combinations of all of these which make it highly suitable for complex computing environments. An important feature of MPI is that it can be used easily regardless of the processing speed, so as the processing speed improves the paradigm will not be made obsolete. MPI can be implemented on a great variety of computing environments including those consisting of collections of other sub-environments, parallel or not, connected by a communication network or a communication means. In addition, MPI provides many features intended to improve performance on scalable parallel computers having specialized interprocessor communication hardware.

A data staging buffer 551, having a plurality of data storage locations including a send FIFO (SEND FIFO) and a receive FIFO (RECEIVE FIFO) is provided at node 510, as controlled by an adapter 531. A like data staging buffer 552 is provided at node 520. The data staging buffers 551 and 552 can be implemented in contiguous areas of a memory or multiple non-contiguous areas or units.

In the embodiment of the invention shown in FIG. 4, data packets are transferred using the SEND FIFO buffer 561 of node 510 at the sender side and the RECEIVE FIFO buffer 572 of node 520 at the receiver side of the transfer. Data to be transferred from node 510 to node 520 are placed in the SEND FIFO buffer 561 of node 510. Such data is then sent by the network adapter 531 over network 580 to the RECEIVE FIFO buffer 572 at the receiving node 520.

Steps in the transfer of data are now described. Initially, an upper level protocol (ULP) such as MPI or LAPI requests that a chunk of data, for example, 109 bytes, be moved from node 510 to node 520. A lower level protocol, e.g., HAL, responding to the request, then copies the data to be transferred into the SEND FIFO buffer 561 in units of a cache line. In such operation, the data is transferred along cache line boundaries into the SEND FIFO buffer 261 to match one or more whole cache lines of data. In one example, the size of the cache line is 128 bytes. In such case, the lower level protocol moves data in cache-line size units of 128 bytes from the user buffer 541 into the SEND FIFO buffer 561 for transfer to node 520.

Note that the invention does not restrict the size of the units of data to be transferred, e.g., the cache line size, with which the invention is designed to operate. Different size units of data having different lengths can be utilized. Moreover, transfer sizes that are based upon other storage sizes, e.g. memory block size, page size, buffer FIFO line size, etc. can be utilized instead of the cache line size as the basic size of the unit to be moved. When the cache line size is the basic unit to be moved as here, the number of cache lines needed to transfer the requested amount of data is determined by dividing the requested transfer amount by the cache line size and then rounding up to the next higher number of cache lines.

Transferring the data in units of one or more whole cache lines allows the entire 109 bytes to be transferred during one atomic operation. The method described herein is of particular benefit to systems where it is faster to transmit data as an integral number of standard size units than to transmit data in greater or less than such standard size units. In systems having SEND FIFO buffers and RECEIVE FIFO buffers for moving data between nodes such as here, a lower level protocol layer, e.g., HAL, and the network adapter, move the data in units of a cache line without direct control being asserted over the data movement by the upper level protocols on the respective nodes.

During or after the data is copied from user buffer 541 to the SEND FIFO 561, the network adapter 531 copies the 128 bytes of data from the SEND FIFO buffer 561 to adapter memory 565 and transfers the 128 bytes of data in one atomic operation over the network 580 to the RECEIVE FIFO 572 of node 520. At node 520 at the receiving end, the network adapter 532 receives the 128 bytes of data into adapter memory 566 and copies the 128 bytes of data into a RECEIVE FIFO buffer 572. The lower level protocol on the node 520 at the receiving end takes only the 109 bytes of data that was requested to be transferred and presents that data to the upper level protocol, indicating the exact location in the RECEIVE FIFO buffer 572 in which the 109 bytes of data are located. In other words, only the 109 bytes (out of the 128 bytes of the cache line size unit that was transferred) are presented to the upper level protocol.

In cases where LAPI or MPI are used in conjunction with HAL, the LAPI or the MPI directs HAL to transfer the non cache line-aligned data to the requested target node as described above. However, although both MPI and LAPI operate in conjunction with the above-described embodiments of the invention, they are only examples of some of the many upper layer protocols for which embodiments of the invention are intended to benefit.

Figure 5:
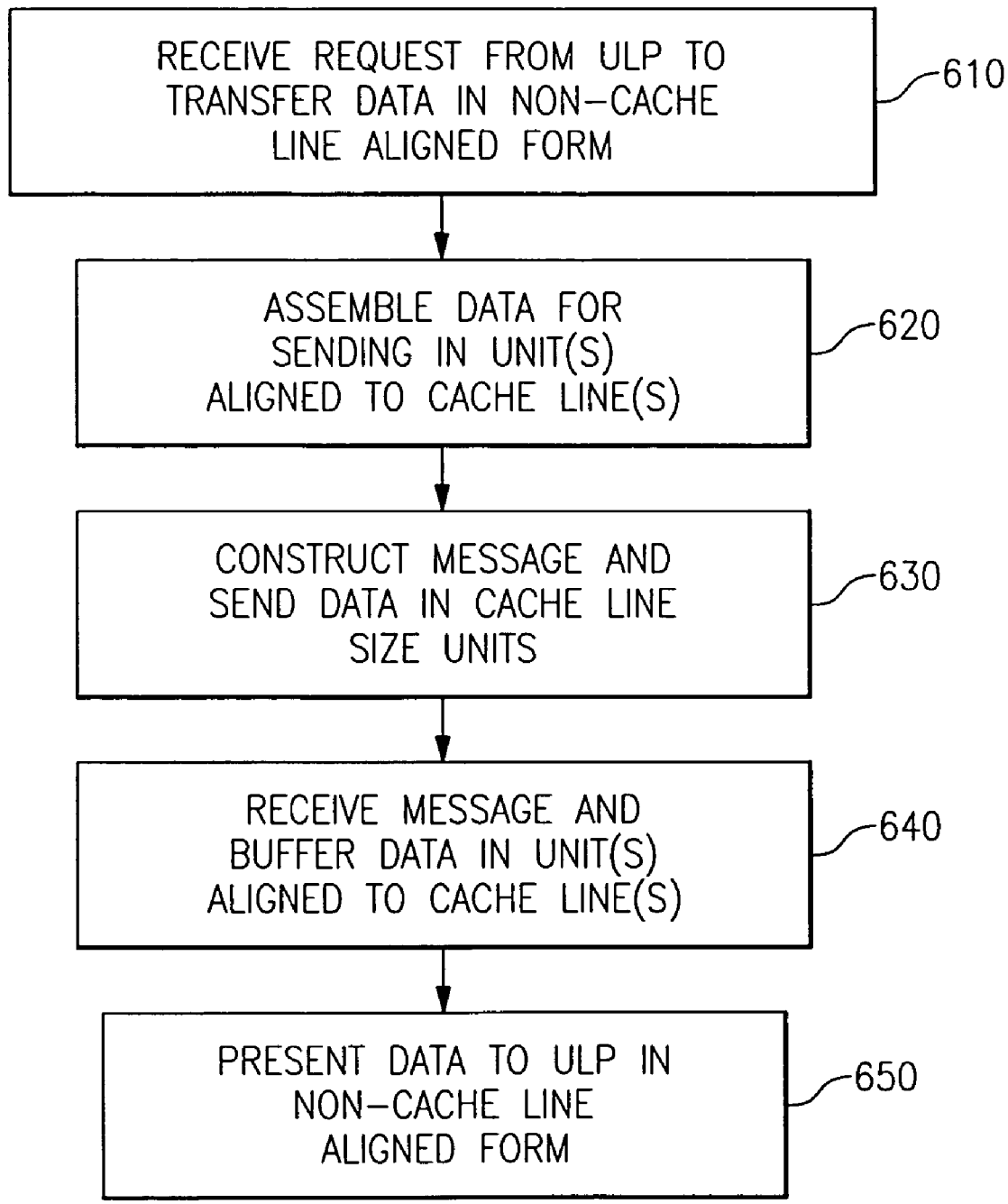
FIG. 5 is a flowchart illustrating operation according to an embodiment of the present invention.

FIG. 5 is a flowchart illustrating a sequence of operations performed in a method of transferring data between one node of a network and another, wherein the data needed to be transferred is not aligned to cache line boundaries. At step 610, an upper layer protocol (ULP) operating on one node of a network requests data to be transferred to another node. The data to be transferred is not aligned to cache line boundaries, i.e., the data straddles a cache line boundary of the memory, and/or the data has total length which is not equal to an integral number of cache line-size units of data. In step 620, the data is assembled to be sent in fulfillment of the transfer request. An amount of data is assembled by a lower level protocol in an outgoing send FIFO buffer (SEND FIFO) that is aligned to cache line boundaries and which equals an integral number of one or more cache line-size units of data. The lower level protocol does so by copying the data from a location in a user buffer which is available to the sending node, the location as indicated in the transfer request made by the ULP. The lower level protocol then notifies the adapter that there is data ready to be sent from the SEND FIFO.

In step 630, the network adapter on the sending node constructs second data containing the one or more integral numbers of cache line-size units of data and sends the second data into the network for delivery to the receiving node. Thereafter, in step 640, a network adapter at the second node receives the second data and buffers the data in an incoming receive FIFO buffer (RECEIVE FIFO), the second data again being buffered in units of data which are aligned to cache lines, each unit having the same size as the cache line size defined for the nodes of the network. Thereafter, in step 650, the lower level protocol then notifies the ULP of the arrival of the transferred data and provides sufficient details to the ULP for it to collect only the data that was originally requested to be transferred thereto by the first node. Accordingly, by such method, the ULP on a first node of the network transfers data which is not aligned to cache line boundaries from the first node to the second node for receipt of the ULP operating on the second node. However, the data transfer is actually performed in an efficient manner by the lower level protocol and the network adapter transferring an equivalent amount of data between the two nodes that are aligned to cache lines and which have size corresponding to an integral number of cache lines.

According to another aspect of the invention, a machine-readable recording medium having instructions recorded thereon is provided for performing a method of transferring data between first and second nodes of a network.

Accordingly, while the invention has been described in detail herein in accord with certain preferred embodiments thereof, still other modifications and changes therein may be effected by those skilled in the art. Accordingly, it is intended by the appended claims to cover all such modifications and changes as fall within the true spirit and scope of the invention.

The invention claimed is:

1. A method of transferring data between first and second nodes of a network, comprising: requesting, by a first upper layer protocol (ULP) operating on the first node of the network, first data to be transferred, wherein the first data has a length equal to an integral number of smaller than a standard units of data and is located in a first user buffer; buffering, by a lower protocol layer of the first node of the network, the lower protocol layer being lower than the first ULP, second data in a send buffer for transfer to the second node, the second data including an integral number of standard size units of data, the second data including the first data; copying the second data from the send buffer to a first adapter memory of a first network adapter at the first node of the network; posting, by the first network adapter, the second data to the network for delivery to the second node of the network; receiving the second data by a second network adapter at the second node of the network; copying the received second data from a second adapter memory of the second network adapter to a receive buffer at the second node of the network; and from the received buffer, delivering the first data to a second ULP operating on the second node of the network, wherein the length of the first data as delivered is equal to the length of the first data to be transferred and not the length of the second data, such that remaining data of the second data is not delivered, and wherein the first data as delivered is located in a second user buffer at the second node of the network.

2. The method as claimed in claim 1, wherein the posting includes posting each unit of the second data to the network by a network adapter layer protocol.

3. The method as claimed in claim 2, wherein the posting of the one unit of the second data cannot be interrupted while in progress.

4. The method as claimed in claim 1, wherein the network is to transfer data in units of a standard size rather than in units smaller than the standard size, and the second data, which includes the first data, has a size equal to the standard size, and further comprising transferring by the network the second data, wherein the amount of the data being transferred is larger than the amount of data requested to be transferred.

5. The method as claimed in claim 1, wherein the standard size unit of the second data is equal to a size of a cache line of caches utilized by the first and the second nodes.

6. The method as claimed in claim 5, wherein the send buffer is a send first-in-first-out (SEND FIFO) buffer utilized by a network adapter layer for transferring data from the memory to the network, and wherein the receive buffer is a receive first-in-first-out (RECEIVE FIFO) buffer.

7. The method as claimed in claim 6, wherein the first data is delivered to the second ULP by identifying the first data from among the received second data.

8. The method as claimed in claim 7, wherein the first ULP includes a protocol layer selected from at least one of a lower layer application programming interface (LAPI) and a message passing interface (MPI).

9. The method as claimed in claim 1, wherein the second data is buffered by copying data from a memory at the first node into the send buffer, the data being copied in units aligned to cache line boundaries of the memory.

10. The recording medium as claimed in claim 9, wherein the second data is buffered by copying the second data from a memory at the first node in the units, aligned to cache line boundaries of the memory, into the send buffer.

11. The recording medium as claimed in claim 10, wherein the first data is delivered to the second ULP from the received second data by identifying the first data to the second ULP from among the received second data.

12. A machine-readable recording medium having instructions recorded thereon for performing a method of transferring data between first and second nodes of a network, the method comprising: requesting, by a first upper layer protocol (ULP) operating on the first node of the network, first data to be transferred, wherein the first data has a length smaller than a standard units of data and is located in a first user buffer; buffering, by a lower protocol layer of the first node of the network, the lower protocol layer being lower than the first ULP, second data in a send buffer for transfer to the second node, the second data including an integral number of standard size units of data, the second data including the first data; copying the second data from the send buffer to a first adapter memory of a first network adapter at the first node of the network; posting, by the first network adapter, the second data to the network for delivery to the second node, wherein the posting includes posting each of the units of the second data to the network by a adapter layer protocol; receiving the second data by a second network adapter at the second node of the network; copying the received second data from a second adapter memory of the second network adapter to a receive buffer at the second node of the network; and from the receive buffer, delivering the first data to a second ULP operating on the second node, wherein the length of the first data as delivered is equal to the length of the first data to be transferred and not the length of the second data, such that remaining data of the second data is not delivered, and wherein the first data as delivered is located in a second user buffer at the second node of the network.

13. The recording medium as claimed in claim 12, wherein the standard size is a size of a cache line used in a cache of the first node and the posting includes posting each of the units of the second data to the network by a network adapter layer protocol.

14. Data communication apparatus operable to transfer data to and receive data from a network, comprising: a first node, said first node comprising an upper layer protocol (ULP) operable to request first data to be transferred to a device through the network, the first data having a length smaller than a standard units of data and being located in a first user buffer; a send buffer on the first node to buffer the second data for transfer, the second data being buffered by a lower protocol layer, responsive to a command issued by the ULP to buffer data for transfer to the network, the second data including an integral number of standard size units of data, the second data including the first data; the first node to copy the second data from the send buffer to a first adapter memory of a first network adapter at the first node, and to post the second data from the first network adapter to the network for delivery to the device; the device operable to receive the second data at a second network adapter, and copy the received second data from a second adapter memory of the second network adapter to a receive buffer at the device; and a lower protocol layer on the device being operable to deliver the first data from the receive buffer to a ULP operating on the device, wherein the length of the first data as delivered is equal to the length of the first data to be transferred and not the length of the second data, such that remaining data of the second data is not delivered, and wherein the first data as delivered is located in a second user buffer at the device.

15. Data communication apparatus as claimed in claim 14, wherein the lower protocol layer is operable to buffer the data in a send first-in-first-out (SEND FIFO) buffer for transferring the data to the network.

16. Data communication apparatus as claimed in claim 14, wherein the lower protocol layer is operable to receive the second data into a receive first-in-first-out (RECEIVED FIFO) buffer.

17. Data communication apparatus as claimed in claim 16, wherein the first data is delivered to the ULP at the second node by identifying the first data to that ULP from among the data received.

18. Data communication apparatus as claimed in claim 14, wherein the lower protocol layer includes a network adapter protocol layer.

* * * * *